US012435879B2

(12) United States Patent
Lee et al.

(10) Patent No.: US 12,435,879 B2
(45) Date of Patent: Oct. 7, 2025

(54) ELECTRIC RANGE

(71) Applicant: LG ELECTRONICS INC., Seoul (KR)

(72) Inventors: Ji Won Lee, Seoul (KR); Junghyeon Cho, Seoul (KR); Myoeng Soo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 537 days.

(21) Appl. No.: 17/826,663

(22) Filed: May 27, 2022

(65) Prior Publication Data

US 2022/0381438 A1 Dec. 1, 2022

(30) Foreign Application Priority Data

May 28, 2021 (KR) ........................ 10-2021-0069398
Jun. 22, 2021 (KR) ........................ 10-2021-0081015

(51) Int. Cl.
*F24C 7/06* (2006.01)
*F24C 15/00* (2006.01)
*H05B 6/12* (2006.01)

(52) U.S. Cl.
CPC ............ *F24C 7/067* (2013.01); *F24C 15/006* (2013.01); *H05B 6/1263* (2013.01)

(58) Field of Classification Search
CPC ...... F24C 15/101; F24C 7/067; F24C 15/006; H05B 6/1263
See application file for complete search history.

(56) References Cited

U.S. PATENT DOCUMENTS

| | | | | |
|---|---|---|---|---|
| 2008/0142512 A1 | 6/2008 | Kim et al. | | |
| 2008/0185376 A1* | 8/2008 | Gagas | H05B 6/1263 219/623 | |
| 2014/0014649 A1* | 1/2014 | Chavan | F24C 15/101 219/620 | |
| 2016/0323938 A1* | 11/2016 | Leonardi | H05B 6/1263 | |
| 2020/0154598 A1 | 5/2020 | Kim et al. | | |

FOREIGN PATENT DOCUMENTS

| | | | |
|---|---|---|---|
| DE | 199 35 835 | 2/2001 | |
| EP | 2 292 979 | 3/2011 | |
| EP | 2746672 A1 * | 6/2014 | F24C 15/101 |
| KR | 10-2008-0054883 | 6/2008 | |
| KR | 10-1307594 | 9/2013 | |
| KR | 10-2020-0053119 | 5/2020 | |

OTHER PUBLICATIONS

European Search Report issued in Application No. 22175998.8 dated Sep. 29, 2022.
Korean Office Action dated Apr. 30, 2025, issued in Application No. 10-2021-0081015.

* cited by examiner

*Primary Examiner* — Thien S Tran
(74) *Attorney, Agent, or Firm* — KED & ASSOCIATES

(57) ABSTRACT

An electric range is provided that may include a case, a case, a cover plate coupled to an upper end of the case, wherein an object to be heated is placed on an upper surface thereof, an air blowing fan configured to discharge air, and an air guide that communicates with the air blowing fan, wherein a cross-sectional area of the flow path of air in a portion of the air guide at which air is discharged outward is greater than a cross-sectional area of the flow path of air at a portion of the air guide at which the air guide and the air blowing fan communicate.

20 Claims, 15 Drawing Sheets

ELECTRIC RANGE

CROSS-REFERENCE TO RELATED APPLICATION(S)

This application claims priority to and benefit of Korean Patent Application Nos. 10-2021-0069398 filed in Korea on May 28, 2021, and 10-2021-0081015 filed in Korea on Jun. 22, 2021, which are hereby incorporated by reference as if fully set forth herein.

BACKGROUND

1. Field

An electric range, and in particular, an electric range having structure capable of cooling an inside of the electric range effectively is disclosed herein.

2. Background

Details in the background section do not constitute prior art but are given only as background information concerning the subject matter of the present disclosure.

Various types of cooking appliances are used to heat food or other items (hereinafter, collective "food") at homes or restaurants. Cooking appliances include gas ranges using gas and electric ranges using electricity.

Electric ranges are classified as resistance heating-type electric ranges and induction heating-type electric ranges. In terms of electrical resistance heating, electric current is supplied to a metallic resistance wire or a non-metallic heat generating element, such as silicon carbide, to generate heat, and the generated heat is radiated or conducted to heat an object to be heated, for example, a cooking container, such as a pot, or a frying pan, for example. In terms of induction heating, high-frequency power is supplied to a coil to generate a magnetic field around the coil, and eddy current produced in the generated magnetic field is used to heat an object to be heated made of a metallic material.

In basic theories of induction heating, when electric current is supplied to a working coil or a heating coil, heat is generated while an object to be heated is heated based on induction heating, and the object to be heated is heated by the generated heat. An electric range that operates based on induction heating is disclosed in KR Patent No. 10-1307594, which is hereby incorporated by reference.

In the above-mentioned patent, a printed circuit board that controls operations of the electric range is mounted on the electric range. To suppress overheating of the printed circuit board, a heat sink that cools heat generating elements producing relatively large amounts of heat can be disposed on the printed circuit board.

An air blowing fan is disposed in a position adjacent to the heat sink to cool the heat sink, and an air guide that guides a flow of air discharged from the air blowing fan is provided to cover the heat sink. Additionally, the air guide and the air blowing fan communicate with each other.

As the electric range operates, a relatively large amount of heat is generated in the heat sink on which the heat generating elements are mounted. Accordingly, air being guided by the air guide and passing through the heat sink is heated and expanded by the heat sink.

As air expands, pressure increases. As air is heated while passing through the air guide, the pressure of the air at an outlet of the air guide becomes greater than at an inlet of the air guide.

In a case in which the pressure of the air at the outlet of the air guide becomes greater than at the inlet of the air guide, the air cannot flow from the inlet of the air guide to the outlet of the air guide smoothly. If the air does not flow smoothly, the heat sink cannot be cooled efficiently by the blown air. These problems need to be solved.

BRIEF DESCRIPTION OF THE DRAWINGS

Embodiments will be described in detail with reference to the following drawings in which like reference numerals refer to like elements, and wherein.

DETAILED DESCRIPTION

Figure 1:
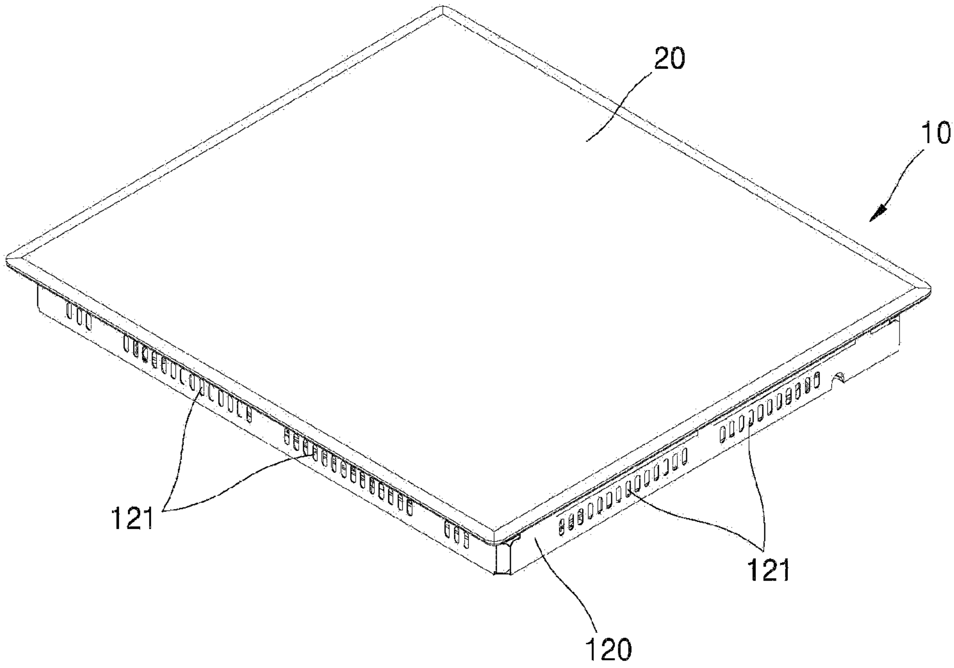
FIG. 1 is a perspective view of an electric range according to an embodiment.

Aspects, features, and advantages are described hereunder with reference to the accompanying drawings such that one having ordinary skill in the art to which embodiments pertain can embody the technical spirit easily. Hereinafter, description of known technologies in relation to the disclosure is omitted if it is deemed to make the gist unnecessarily vague. Hereinafter, embodiments are described with reference to the accompanying drawings. In the drawings, identical reference numerals can denote identical or similar components.

The terms "first", and "second", for example, are used herein only to distinguish one component from another component. Thus, the components should not be limited by the terms. Certainly, a first component can be a second component unless stated to the contrary.

Throughout, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "include" for example, set forth herein, are not interpreted as necessarily including all the stated components or steps but can be interpreted as excluding some of the stated components or steps or can be interpreted as including additional components or steps.

Throughout, the terms "A and/or B" as used herein can denote A, B or A and B, and the terms "C to D" can denote C or greater and D or less, unless stated to the contrary.

Throughout, an "upward-downward direction" denotes an upward-downward direction of an electric range in a state in which the electric range is installed for use. A "leftward-rightward direction" denotes a direction orthogonal to the upward-downward direction, and a "frontward-rearward direction" denotes a direction orthogonal to the upward-downward direction and the leftward-rightward direction. "Both lateral directions" or a "lateral direction" can have the same meaning as the leftward-rightward direction. These terms can be mixedly used hereinafter.

Figure 2:
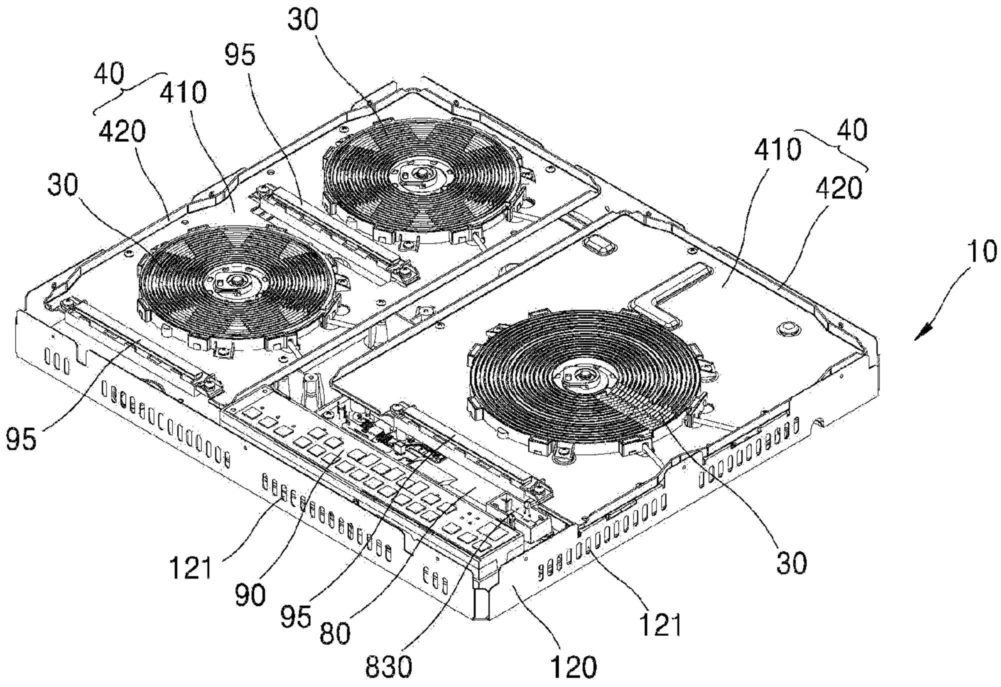
FIG. 2 is a perspective view of the electric range of FIG. 1 without a cover plate.
Figure 3:
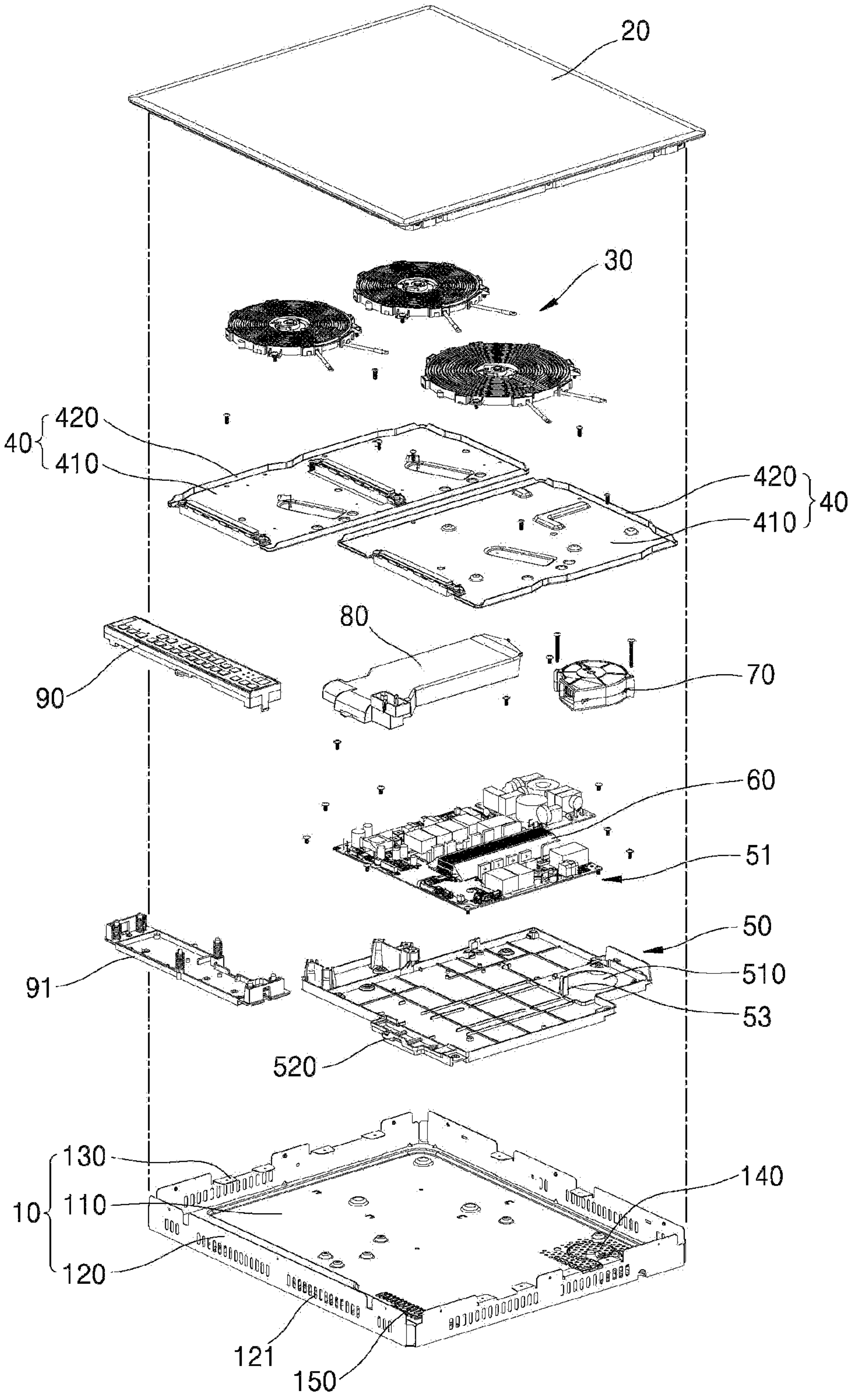
FIG. 3 is an exploded view of the electric range according to an embodiment.
Figure 4:
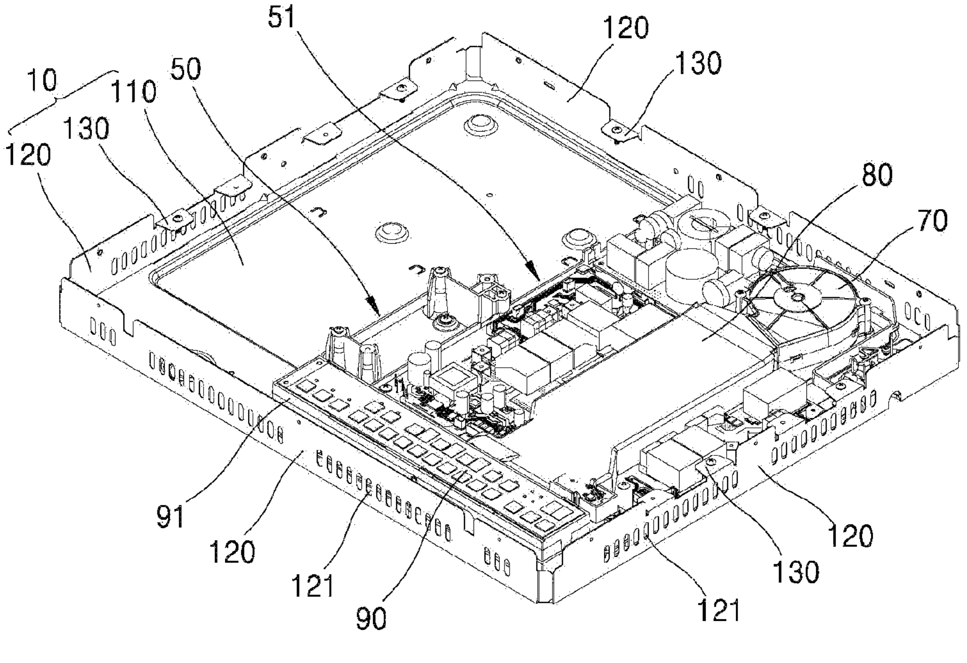
FIG. 4 is a perspective view of the electric range of FIG. 1 without some components.
Figure 5:
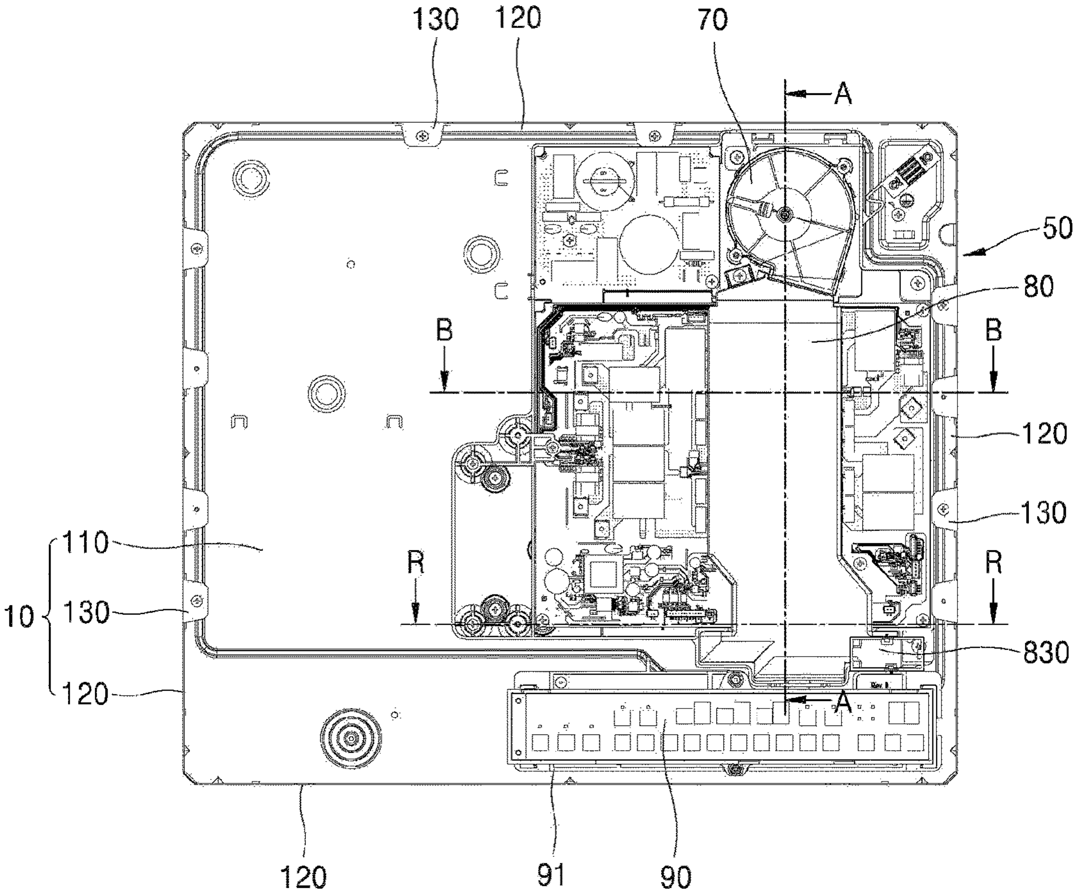
FIG. 5 is a front view of the electric range of FIG. 4.

FIG. 1 is a perspective view of an electric range according to an embodiment. FIG. 2 is a perspective view of the electric range of FIG. 1 without a cover plate. FIG. 3 is an exploded view showing the electric range according to an embodiment. FIG. 4 is a perspective view of the electric range of FIG. 1 without some components. FIG. 5 is a front view of the electric range of FIG. 4.

The electric range according to an embodiment may heat an object to be heated, based on induction heating. In this case, the object to be heated may be a cooking container made of a metallic material, such as stainless steel, or iron for example.

The induction heating method involves supplying high-frequency power to a working coil to generate a magnetic field around the working coil, and heating an object to be heated made of a metallic material, using eddy current produced by the generated magnetic field. That is, as high-frequency power is supplied to a working coil of a heating part or heater 30 having a structure in which the working coil is adjacent to a ferrite core, a magnetic field is generated around the working coil, and as an object to be heated is placed in an area of the generated magnetic field, eddy current is induced to the object to be heated by the magnetic field, and Joule's heat is generated by the eddy current, thereby heating the object to be heated. As the object to be heated, such as a cooking container, is heated, a food or other item (hereinafter, collectively "food") contained in the object to be heated is heated and cooked.

The electric range according to an embodiment may include a case 10, a cover plate 20, the heater 30, an upper bracket 40, and a base bracket 50. The case 10 may protect components constituting the electric range. For example, the case 10 may be made of aluminum; however, embodiments are not limited thereto. Additionally, the case 10 may be thermally insulated to suppress release of heat generated by the working coil of the heater 30 outside of the electric range.

The case 10 may store components, such as the heater 30, a working coil, the upper bracket 40, and a control board 90, for example, that constitute the electric range. An upper portion of the case 10 may be open, and the open portion of the case 10 may be closed by the cover plate 20. The case 10 may be entirely formed into a box by processing plate-shaped materials, for example.

The case 10 may include a first casing 110, a second casing 120, and a third casing 130. The first casing 110 may form a bottom surface of the case 10. The first casing 110 may support the above-described built-in components of the electric range.

The first casing 110 may have at least one vent through which air may flow, such as a printed circuit board 51 disposed in the first casing 110, and circuit element components mounted on the printed circuit board 51. The second casing 120 may be bent from the first casing 110, and form a lateral surface of the case 10. The second casing 120 may be bent from an edge of the first casing 110 in an upward-downward direction, and form the lateral wall of the electric range.

The second casing 120 may be disposed on each side of the first casing 110 entirely formed into a rectangle. The second casing 120 may help to improve the entire rigidity of the case 10. That is, the second casing 120 bent from the first casing 110 may suppress bending of the plate-shaped first casing 110 or damage caused by a weight of the built-in components or an external force.

The second casing 120 may further include a plurality of exhaust holes 121 formed into a slit. The exhaust holes 121 allow an inside and outside of the case 10 to communicate with each other, such that air flows through the exhaust holes 121, and helps to cool the components stored in the case 10.

The third casing 130 may be bent from the second casing 120 and support the upper bracket 40. The third casing 130 may be disposed on each side of the first casing 110.

A first upper plate 410 forming a bottom surface of the upper bracket 40 may be mounted on an upper surface of the third casing 130. The first upper plate 410 and the third casing 130 may be coupled to each other by a coupling tool, such as a bolt, for example.

The cover plate 20 may be coupled to the upper end of the case 10, and an object to be heated may be disposed on an upper surface of the cover plate 20. The cover plate 20 may close the upper portion of the case 10, which is open, to protect the components stored in the case 10.

An object to be heated may be placed on the upper surface of the cover plate 20, and a magnetic field produced in the heater 30 may reach the object to be heated by passing through the cover plate 20. The cover plate 20 may be made of a material including ceramics, for example; however, embodiments are not limited thereto.

An input interface may be disposed on the upper surface of the cover plate 20, and the input interface receives an input from a user. The input interface may be disposed in a predetermined area of the upper surface of the cover plate 20, and display a predetermined image.

The input interface may receive a touch input from the user, and the electric range may be driven based on the touch input received from the user. For example, the input interface may be a module for inputting a heating intensity or heating time, for example, desired by the user, and may be embodied as a physical button or a touch panel, for example. For example, the input interface may be a thin-film-transistor liquid-crystal display (TFT LCD); however, embodiments are not limited thereto.

The control board 90 may be disposed under the cover plate 20, and the control board 90 may input an operation instruction to the electric range. The control board 90 may be provided with a plurality of key switches. The user may control operations of the electric range by inputting an instruction to the control board 90 through the plurality of key switches.

For the electric range according to an embodiment, a board supporter 910 may be provided to stably mount the control board 90 in the case 10. The board supporter 910 may be mounted in the case 10, and the control board 90 may be mounted on the board supporter 910.

The board supporter 910 may be manufactured in a shape required to stably mount the board supporter 910 in the case 10 and reliably mount the control board 90 therein. The board supporter 910 may be made of plastics, for example, that ensures ease of injection molding and may be electrically insulated such that the board supporter 910 is easily manufactured, lightweight, and electrically insulated; however, embodiments are not limited thereto.

For the electric range according to an embodiment, an upper surface of the control board 90 may be in close contact with a lower surface of the cover plate 20. In this case, the control board 90 may be disposed in a position corresponding to a position of the input interface.

The control board 90 may be connected to the input interface, based on a capacitive touch input. Thus, as the user inputs a control instruction to the input interface, the control instruction may be input to the control board 90.

Additionally, a display may be disposed in a predetermined area of the upper surface of the cover plate 20. The display may display a drive state of the electric range.

A light display area may be formed on the upper surface of the cover plate 20. A light source unit 95 may be disposed under the cover plate 20. Light radiated from the light source unit 95 may be delivered to the user through the light display area.

In this case, the light display area and the light source unit 95 may be disposed in positions where the light display area and the light source unit 95 correspond to each other. When a plurality of light source units 95 is provided, a number of the light display areas provided on the upper surface of the cover plate 20 may be the same as a number of the light source units 95.

The electric range according to an embodiment may further include a cover bracket that supports the cover plate 20. An upper surface of the cover bracket may support the cover plate 20, and the covet bracket may be coupled to the second casing 120 of the case 10 by a coupling tool, such as a screw bolt, for example.

A plurality of heaters 30 may be disposed under the cover plate 20, and heat an object to be heated. In this embodiment, the plurality of heaters 30 may be based on induction heating. In another embodiment, the electric range may be embodied as a hybrid range in which a portion of a plurality of heaters 30 is based on induction heating, and a remaining portion is embodied as a highlight heating apparatus based on electrical resistance heating.

Hereafter, an electric range with the plurality of heaters 30, all of which is based on induction heating, is described.

The heater 30 may be mounted on the upper bracket 40, and in this embodiment, a total of three heaters is provided. However, the number of heaters 30 is not limited thereto. When a plurality of heaters 30 is provided, a plurality of upper brackets 40 may be provided to support the plurality of heaters 30 if necessary.

The heater 30 may be provided with a core frame, a working coil may be spirally wound around an upper surface of the core frame, and a ferrite core may be mounted on a lower surface of the core frame. Thus, as high-frequency power is supplied to the working coil, a magnetic field may be formed around the ferrite core, and the formed magnetic field may induce an eddy current to an object to be heated.

The upper bracket 40 may be disposed under the heater 30, and support the heater 30. In this embodiment, a plurality of upper brackets 40 may be provided. The upper bracket 40, for example, may be made of aluminum; however, embodiments are not limited thereto.

The upper bracket 30 may be formed into an approximate box shape by processing plate-shaped metal, for example, and serve as a structure that supports the heaters 30. The upper bracket 40 may include a first upper plate 410, and a second upper plate 420. The first upper plate 410 may form a bottom surface of the upper bracket 40, and the heater 30 may be mounted on the first upper plate 410.

The first upper plate 410 may be provided to cover the printed circuit board 51 disposed thereunder in the upward-downward direction. When a plurality of upper brackets 40 is provided, a single first upper plate 410 may cover the printed circuit board 51, or a plurality of first upper plates 410 may be coupled to each other to cover the printed circuit board 51, depending on a surface area of the printed circuit board 51.

The first upper plate 410 may block electromagnetic fields and electromagnetic waves generated from the heater 30 from reaching the printed circuit board 51, and elements mounted on the printed circuit board 51. That is, the upper bracket 40 may help to improve electromagnetic compatibility (EMC)) and electromagnetic interference (EMI) for the printed circuit board 51.

The second upper plate 420 may be bent from the first upper plate 410 in the upward-downward direction of the electric range. The second upper plate 420 may be bent from the edges of the first upper plate 410 in the upward-downward direction.

The second upper plate 420 may be disposed on each side of the first upper plate 410 entirely formed into a rectangle. When a plurality of upper brackets 40 is provided, the second upper plate 420 may be formed on each side of the first upper plate 410 except for a side of each upper bracket 40 that is adjacent to a side of another upper bracket 40.

The second upper plate 420 may help to improve the entire rigidity of the upper bracket 40. That is, the second upper plate 420 bent from the first upper plate 410 may suppress bending of the plate-shaped first upper plate 410 or damage that is caused by the weight of the built-in components including the heater 30 or an external force.

The light source unit 95 may be disposed on the upper bracket 40. For example, the light source unit 95 may be disposed on the printed circuit board 51 disposed under the upper bracket 40, and the upper bracket 40 may have an opening disposed in a position corresponding to the position of the light source unit 95.

As another embodiment, the light source unit 95 may be disposed on the upper bracket 40, and electrically connected to the printed circuit board 51 disposed thereunder. FIGS. 2 and 3 show that the light source unit 95 is disposed on the upper bracket 40 in the electric range according to an embodiment.

As described above, a light display area may be formed in a portion of the cover plate 20, which corresponds to the portion of the light source unit 95. The light source unit 95 may be provided in such a way that a plurality of LEDs are arranged in a line, for example.

The light source unit 95 may light up as the heater 30 operates, to inform a user whether the heater 30 operates. Alternatively, the light source unit 95 may change a shape, or color, for example, of the light of the plurality of LEDs to inform the user about an operation state of the electric range.

The number of the light source units 95 may be properly determined depending on the number of the heaters 30. FIGS. 2 and 3 show that three light source units 95 are provided for three heaters 30. However, the number of the light source units 95 is not limited thereto.

A base bracket 50 may be disposed under the upper bracket 40, and the printed circuit board 51 may be mounted on the base bracket 50. The base bracket 50 may include a bottom plate and a lateral plate. The bottom plate may form a bottom surface of the base bracket 50, and the printed circuit board 51 may be mounted on an upper surface of the bottom plate.

The lateral plate may be bent from the bottom plate in the upward-downward direction of the electric range. The lateral plate may be bent from an edge of the bottom plate in the upward-downward direction.

The lateral plate may be disposed on each side of the bottom plate that is entirely formed into a rectangle. When a plurality of upper brackets 40 is provided, the lateral plate may be formed on each side of the bottom plate except for the side of each upper bracket 40 that is adjacent to the side of another upper bracket 40.

The lateral plate may help to improve an entire rigidity of the base bracket 50. That is, the lateral plate bent from the bottom plate may suppress bending of the plate-shaped bottom plate or damage that is caused by the weight of the built-in components, such as the circuit board, for example, or an external force.

The base bracket 50 may be made of plastics, for example, that ensures ease of injection molding and may be electrically insulated such that the base bracket 50 is easily manufactured, lightweight, and electrically insulated; however, embodiments are not limited thereto.

The printed circuit board 51 may constitute a controller, receive power from an external power source, and be provided to communicate with an external device in a wired or wireless manner. The electric range may include a wireless communication circuit board for wireless communication with an external device, and the printed circuit board 51 may be electrically connected to the wireless communication circuit board.

The printed circuit board 51 may be electrically connected to the control board 90, and receive an instruction input by the user from the control board 90. The printed circuit board 51 may be electrically connected to the light source unit 95 and the working coil, and control their operations.

A heat sink 60 may be mounted on the printed circuit board 51. In addition, various types of active elements and passive elements for operating the electric range may be mounted on the printed circuit board 51, and the printed circuit board may be provided with an electric circuit.

The electric range according to an embodiment may further include the heat sink 60, an air blowing fan 70, and an air guide 80. The printed circuit board 51 may have elements mounted thereon, and the elements may generate heat as the electric range operates.

For example, switching elements in charge of control over the turn-on/turn-off of the heater 30 generate a large amount of heat, in the electric range. To suppress overheating-induced operational errors or failure of the electric range, the elements need to be cooled.

The electric range according to an embodiment may be provided with the heat sink 60, the air blowing fan 70, and the air guide 80 to cool the elements of the printed circuit board 51. Hereinafter, elements that generate a large amount of heat and need to be cooled are referred to as heat generating elements 60.

The heat sink 60 may protect components stored in the case 10 by cooling the inside of the case 10. The heat sink 60 may be mounted on the printed circuit board 51, and cool the printed circuit board 51. Additionally, the heat sink 60 may reduce heat induced by an electromagnetic interaction that is generated as the heater 30 operates.

For example, the heat sink 60 may include a plurality of cooling fins 610, and the air guide 80 may cover the plurality of cooling fins 610 and guide air to the plurality of cooling fins 610. The heat sink 60 and the plurality of cooling fins 610 are described with reference to the drawings, hereinafter.

The air blowing fan 70 may be mounted in the base bracket 50 and discharge air toward the heat sink 60. The air blowing fan 70 may electrically connect to the printed circuit board 51, and operations thereof may be controlled by the controller embodied by the printed circuit board 51.

Referring to FIG. 5, a guide wall may be formed at an outlet of the air blowing fan 70, through which air may be discharged, such that air blown by the air blowing fan 70 flows to the heat sink 60. The guide wall may guide a flow of the air in a direction in which the heat sink 60 is disposed. As the air blowing fan 70 operates, air in the case 10 may be blown to the heat sink 60, such that insides of the case 10 and the printed circuit board 51 are cooled by the heat sink 60.

Figure 6:
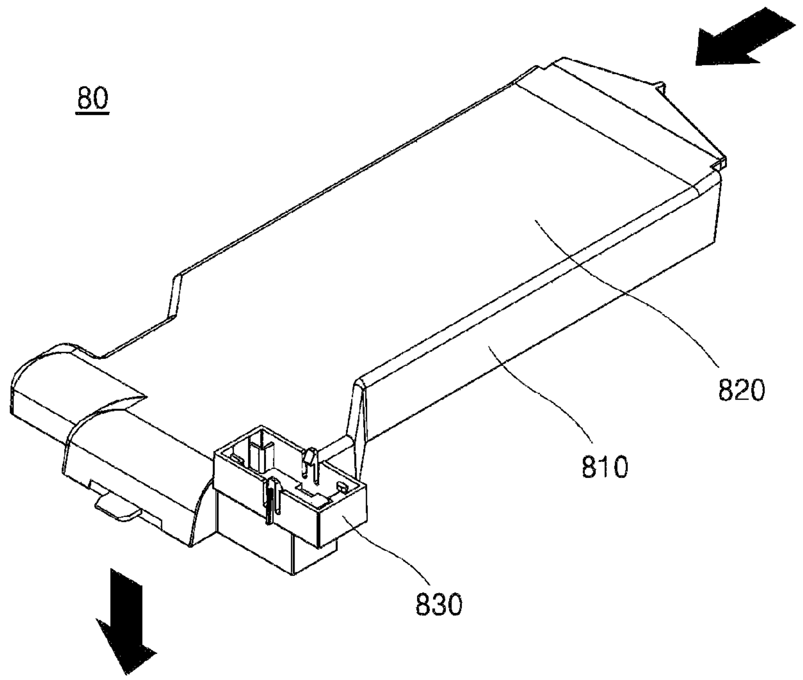
FIG. 6 is a perspective view of an air guide according to an embodiment.
Figure 7:
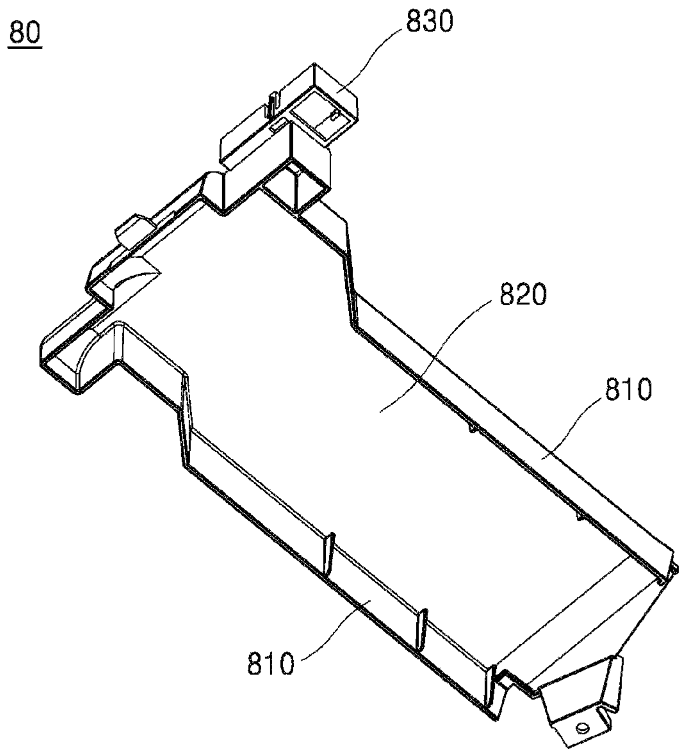
FIG. 7 is a perspective view of the air guide of FIG. 6 viewed in a different direction.
Figure 8:
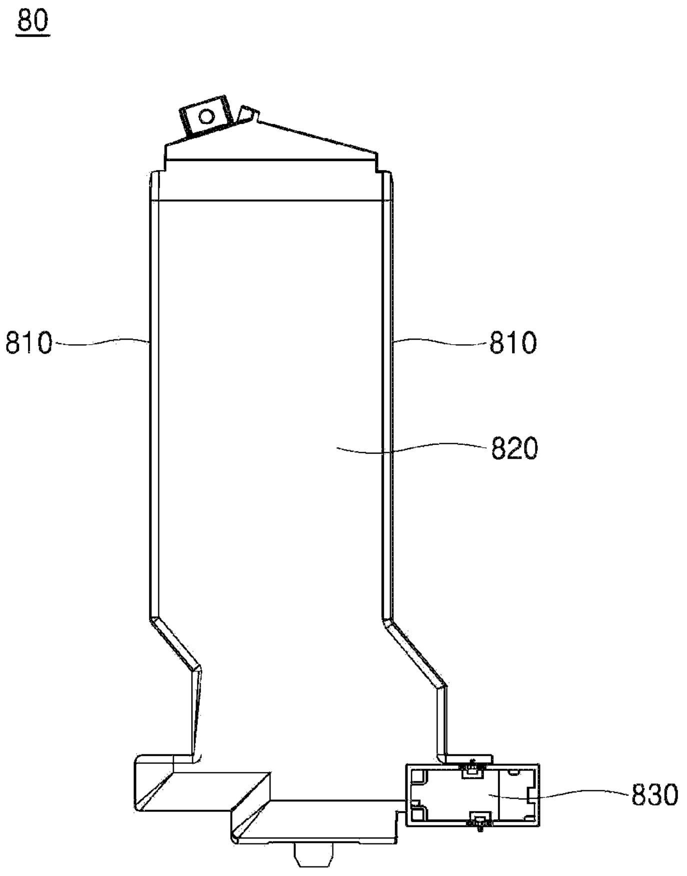
FIG. 8 is a plan view of the air guide according to an embodiment.
Figure 9:
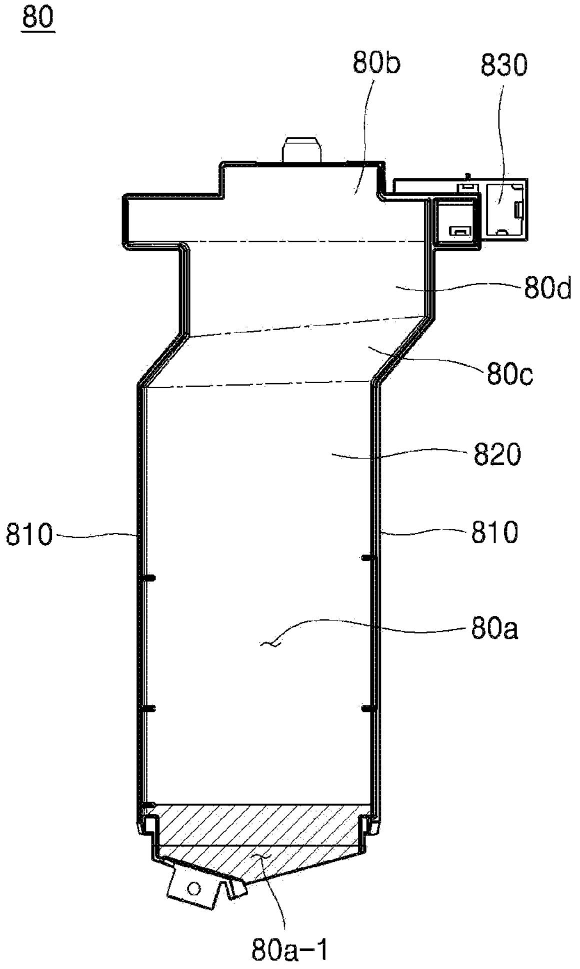
FIG. 9 is a bottom view of the air guide according to an embodiment.

FIG. 6 is a perspective view of an air guide according to an embodiment. FIG. 7 is a perspective view of the air guide of FIG. 6 viewed in a different direction. FIG. 8 is a plan view of the air guide according to an embodiment. FIG. 9 is a bottom view of the air guide according to an embodiment.

The air guide 80 may communicate with the air blowing fan 70, surround the heat sink 60, and form a flow path of air that cools the heat sink 60. The air guide 80 may be made of plastics, for example, that ensures ease of injection molding and may be electrically insulated; however, embodiments are not limited thereto.

The arrows in FIG. 6 indicate a direction in which air flows. Referring to FIG. 6, the air guide 80 may change the direction in which air flows. That is, the air guide 80 may direct air to flow in the frontward-rearward direction of the electric range at an inlet of the air guide 80 and allow air to flow in an upward-downward direction of the electric range at an outlet of the air guide 80.

Air discharged from the air blowing fan 70 may flow into the air guide 80 in the frontward-rearward direction of the electric range and flow from the air guide 80 in a downward direction of the electric range.

The air guide 80 may be detachably coupled to the base bracket 50. A rear of the air guide 80, adjacent to the air blowing fan 70, may be coupled to the base bracket 50 by a coupling tool, such as a screw bolt, for example. Additionally, a front of the air guide 80, at which air is discharged, may be shape-fitted to the base bracket 50, for example.

The air guide 80 may include a first lateral wall 810 and a second lateral wall. A space in which air flows may be formed by the first lateral wall 810 and the second lateral wall.

A pair of the first lateral wall 810 may be respectively disposed on both sides of the heat sink 60. An upper wall 820 may be coupled to an upper end of the pair of the first lateral walls 810 to cover the heat sink 60.

The space formed by the first lateral wall 810 and the second lateral wall becomes a flow space in which air flows. The heat sink 60 may be disposed in the flow space such that the heat sink 60 is cooled by air flowing in the flow space of the air guide 80.

The air guide 80 may include a communication substrate mounting part or mount 830. The communication substrate mount 830 may be disposed in a portion that protrudes laterally from an end portion of the upper bracket 40, in a state in which the air guide 80 is mounted on the electric range.

A wireless communication circuit board mounted on a WiFi mounting part or mount may be disposed not to overlap the upper bracket 40 made of a metallic material in the upward-downward direction. Accordingly, the wireless communication circuit board may smoothly communicate with an external device, without being interfered with by jamming of the upper bracket 40 made of a metallic material.

Referring to FIG. 9, the air guide 80 may include a first area 80*a*, a second area 80*b*, a third area 80*c*, and a fourth area 80*d*. The first 80*a* to fourth 80*d* areas may be areas into which the flow space of air, formed in the air guide 80, is divided.

The first area 80*a* may communicate with the air blowing fan 70, and guide air such that the air flows in a lateral direction of the base bracket 50. In this case, the heat sink 60 may be disposed in the first area 80*a*. Air having flown into the air guide 80 from the air blowing fan 70 may flow into the heat sink 60 and cool the heat sink 60 while passing through the first area 80*a* of the air guide 80.

The second area 80*b* may be bent in an upward-downward direction of the base bracket 50 and guide air such that the air is discharged outward. The second area 80*b* may face a lower side of the electric range, and change a flow direction of the air having flow into the air guide 80. That is, the air guide 80 may guide air, discharged from the second area 80*b*, to a lower portion of the case 10 as the upper wall 820 is bent downward in the second area 80*b*.

With the above-described structure, air discharged from the air blowing fan 70 may flow into the air guide 80 in the frontward-rearward direction of the electric range, and flow from the air guide 80 in the downward direction of the electric range, as indicated by the arrows in FIG. 6.

The third area 80*c* and the fourth area 80*d* may be formed between the first area 80*a* and the second area 80*b*. The third area 80*c* may extend from the first area 80*a*, and change a flow direction of air having passed through the first area 80*a*. The third area 80*c* may be formed in such a way that the first lateral wall 810 is bent to have a slant in the end portion of the first area 80*a*.

That is, the first lateral wall 810 may be formed to have a slant with respect to the frontward-rearward direction of the air guide 80 at an inlet of the third area 80*c* of the air guide 80. With this structure, air may flow at a slant with respect to the frontward-rearward direction of the air guide 80 in the third area 80*c*.

As the third area 80*c* is formed as described above, elements on the printed circuit board 51 and the first lateral wall 810 do not meet each other in a portion where the air guide 80 overlaps the base bracket 50 in the upward-downward direction, when the air guide 80 is mounted on the base bracket 50. That is, the third area 80*c* may have a slant to avoid elements disposed on the printed circuit board 51.

The fourth area 80*d* may extend from the third area 80*c*, communicate with the second area 80*b*, and change a flow direction of air having passed through the third area 80*c*. The fourth area 80*d* may be formed in such a way that the first lateral wall 810 is bent to have a slant in the end portion of the third area 80*c*. That is, the first lateral wall 810 may be formed to have a slant with respect to the first lateral wall 810 of the third area 80*c* at an outlet of the third area 80*c* of the air guide 80. With this structure, air flowing in the air guide 80 may flow in the frontward-rearward direction of the air guide 80 again in the fourth area 80*d*.

Air having passed through the fourth area 80*d* may be directed out of the lower portion of the electric range through the second area 80*b*. Referring to FIG. 9, air, having flown in the air guide 80 in the frontward-rearward direction of the electric range to an outlet of the fourth area 80*d*, may change its flow direction in the second area 80*b*, flow in the downward direction of the electric range through an outlet of the second area 80*b*, and then be discharged out of the air guide 80.

The upper wall 820 may be bent downward in the second area 80*b* and guide air discharged from the second area 80*b* to the lower portion of the case 10. That is, air may be discharged from the air guide 80 through the second area 80*b* marked in FIG. 9, and flow in the downward direction of the electric range, that is, flow to the lower portion of the case 10.

As the electric range operates, a relatively large amount of heat may be generated in the heat sink 60 on which heat generating elements 61 are mounted. Accordingly, air being guided by the air guide 80 and passing through the heat sink 60 may be heated and expanded by the heat sink 60.

As air expands, pressure increases. As air is heated while passing through the air guide 80, the pressure of the air at the outlet of the air guide 80 may be greater than at the inlet of the air guide 80.

In a case in which the pressure of the air at the outlet of the air guide 80 is greater than at the inlet of the air guide 80, the air may not smoothly flow from the inlet of the air guide 80 to the outlet of the air guide 80. If the air does not flow smoothly, the heat sink 60 may not be cooled efficiently by the blown air.

According to embodiments disclosed herein, the air guide 80 has structure in which a pressure of air decreases from the inlet of the air guide 80 toward the outlet of the air guide 80, enabling air to flow in the air guide 80.

For the air guide 80 according to embodiments disclosed herein, a cross-sectional area of a path through which air flows at a portion through which air is discharged may be greater than a portion where the air guide 80 communicates with the air blowing fan 70. That is, the outlet of the air guide 80 may have a greater cross-sectional area than the inlet of the air guide 80.

For example, the cross-sectional area of the air guide 80 may increase gradually from the inlet of the air guide 80 to the outlet of the air guide 80. According to embodiments disclosed herein, the cross-sectional area of the air guide 80 may denote a cross-sectional area of a flow space the air guide 80 formed by the first lateral wall 810 and the upper wall 820, when the air guide 80 is cut in a direction perpendicular to an average flow direction of air in the air guide 80. Further, a cross-sectional area of the air guide 80 in the second area 80*b* denotes a cross-sectional area of the second area 80*b* marked in FIG. 9.

A cross-sectional area of a portion to where air flows into the heat sink 60 may be greater than that of a portion where air flows from the heat sink 60 in the air guide 80. Referring to FIG. 9, the air guide 80 may include first area 80*a* and second area 80*b*, as described above. The first area 80*a* may communicate with the air blowing fan 70 and guide air such that the air flows in the lateral direction of the base bracket 50. The second area 80*b* may be bent in the upward-downward direction of the base bracket 50 and guide air such that the air is discharged outward.

As the heat sink 60 is disposed in the first area 80*a* of the air guide 80, the portion where air flows into the heat sink 60 may be the first area 80*a* of the air guide 80. Additionally, the portion where air flows from the heat sink 60 may be the second area 80*b*. Accordingly, a cross-sectional area of the second area 80*b* may be greater than a cross-sectional area of the first area 80*a*.

In this case, a ratio of the first area 80*a* to the second area 80*b* in cross-sectional areas may be determined based on a heating-induced expansion coefficient of air. When a volume expansion ratio of the cross-sectional area of the first area 80*a* to the cross-sectional area of the second area 80*b* is greater than a heating-induced volume expansion degree of air, pressure of air in the second area 80*b* may be less than in the first area 80*a* despite the heating-induced expansion of air.

Results of examination of a heating-induced expansion degree of air in an actual product corresponding to the electric range according to an embodiment reveal that the volume expansion of air, caused by heating, at the outlet of the air guide 80, that is, in the second area 80*b* may be about 1.2 times greater than at the inlet of the air guide 80, that is, in the first area 80*a*. Accordingly, the cross-sectional area of the second area 80*b* may be greater than the cross-sectional area of the first area 80*a* by 1.2 or more times. More specifically, the cross-sectional area of the second area 80*b* may be 1.5 times or three times greater than the cross-sectional area of the first area 80*a*.

When the air guide 80 has the above-described ratio of the first area 80*a* to the second area 80*b* in their cross-sectional areas, pressure of air in the second area 80*b* may be less than in the first area 80*a* despite heating-induced expansion of the air. As a result, air may flow smoothly from the inlet to the outlet in the air guide 80.

As described above, the air guide 80 may further include the third area 80*c* and the fourth area 80*d*. The third area 80*c* may extend from the first area 80*a* and change a flow direction of air having passed through the first area 80*a*. The fourth area 80*d* may extend from the third area 80*c*, communicate with the second area 80*b*, and change a flow direction of air having passed through the third area 80*c*.

In this case, a cross-sectional area of the fourth area 80*d* may be greater than the cross-sectional area of the first area 80*a*, and the cross-sectional area of the second area 80*b* may be greater than the cross-sectional area of the fourth area 80*d*. That is, the cross-sectional area of the air guide 80 through which air flows may increase gradually from the inlet to the outlet. More specifically, the cross-sectional area of the air guide 80 may increase gradually from the first area 80*a*, the fourth area 80*d* to the second area 80*b*.

Considering a design value of the actual air guide 80, the cross-sectional areas of the first area 80*a*, the fourth area 80*d*, and the second area 80*b* may be respectively 1670 $mm^2$, 2410 $mm^2$ and 3510 $mm^2$, for example. However, the numerical values are provided only as an example, and different numerical values may be applied. The second area 80*b*, as illustrated in FIG. 9, may expand properly in the lateral direction and the frontward-rearward direction of the air guide 80, to have the cross-sectional area of above-described size.

The expansion structure needs to be designed to have a shape in which the air guide 80 does not overlap the elements disposed on the printed circuit board 51 in the upward-downward direction of the electric range when the air guide 80 is mounted on the base bracket 50. The cross-sectional area of the air guide 80 through which air flows may increase gradually from the inlet toward the outlet, thereby effectively preventing suppression of smooth flow of air, which is caused when air flows in a scattered manner due to a rapid increase in the cross-sectional area of any certain portion.

A cross-sectional area at a boundary of the first area 80*a* and the third area 80*c* may be smaller than a cross-sectional area at a boundary between the third area 80*c* and the fourth area 80*d*. In FIG. 9, the boundary of the first area 80*a* and the third area 80*c*, and the boundary between the third area 80*c* and the fourth area 80*d* are indicated by virtual lines (dash-double-dot lines).

That is, as the cross-sectional area of the third area 80*c* increases from the inlet toward the outlet, the third area 80*c* may have a structure in which the cross section of the third area 80*c* expands further from the inlet toward the outlet. With this structure, suppression of smooth flow of air, caused due to a rapid increase in the cross-sectional area of the third area 80*c*, may be prevented effectively.

As another embodiment, the cross-sectional area of the first area 80*a* through which air flows may increase gradually from an inlet to an outlet. Likewise, the cross-sectional area of the fourth area 80*d* through which air flows may increase gradually from an inlet toward an outlet.

The air guide 80 according to an embodiment has a structure in which the cross-sectional area of the air guide 80 through which air flows expands from the inlet toward the outlet, such that pressure of air decreases from the inlet of the air guide 80 toward the outlet of the air guide 80 even if the air is heated and expanded. With this structure, air flowing into the air guide 80 may flow smoothly from the inlet of the air guide 80 to the outlet of the air guide 80, thereby improving cooling efficiency of the heat sink 60 disposed in the air guide 80.

Figure 10:
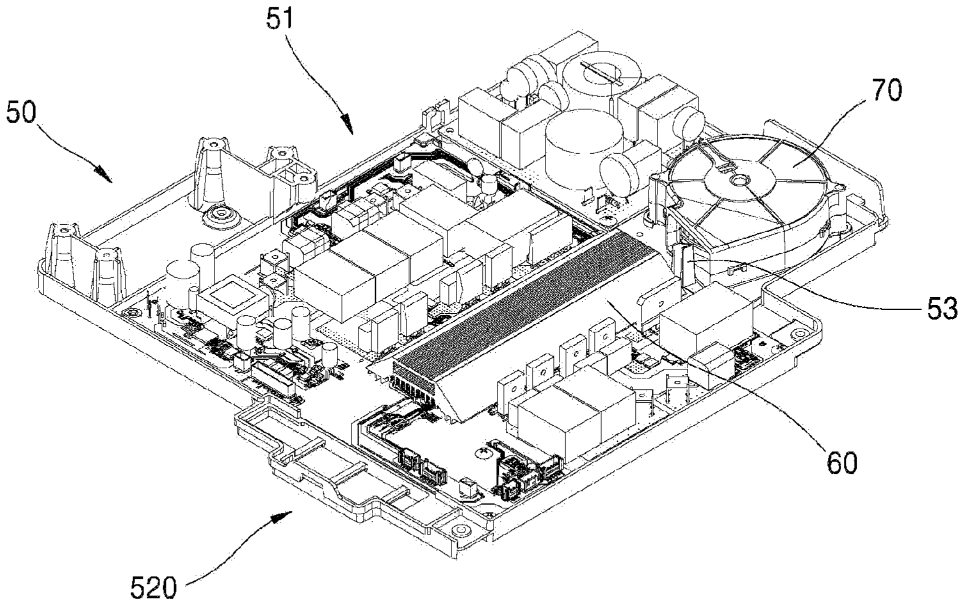
FIG. 10 is a perspective view showing a printed circuit board mounted on a base bracket according to an embodiment.
Figure 11:
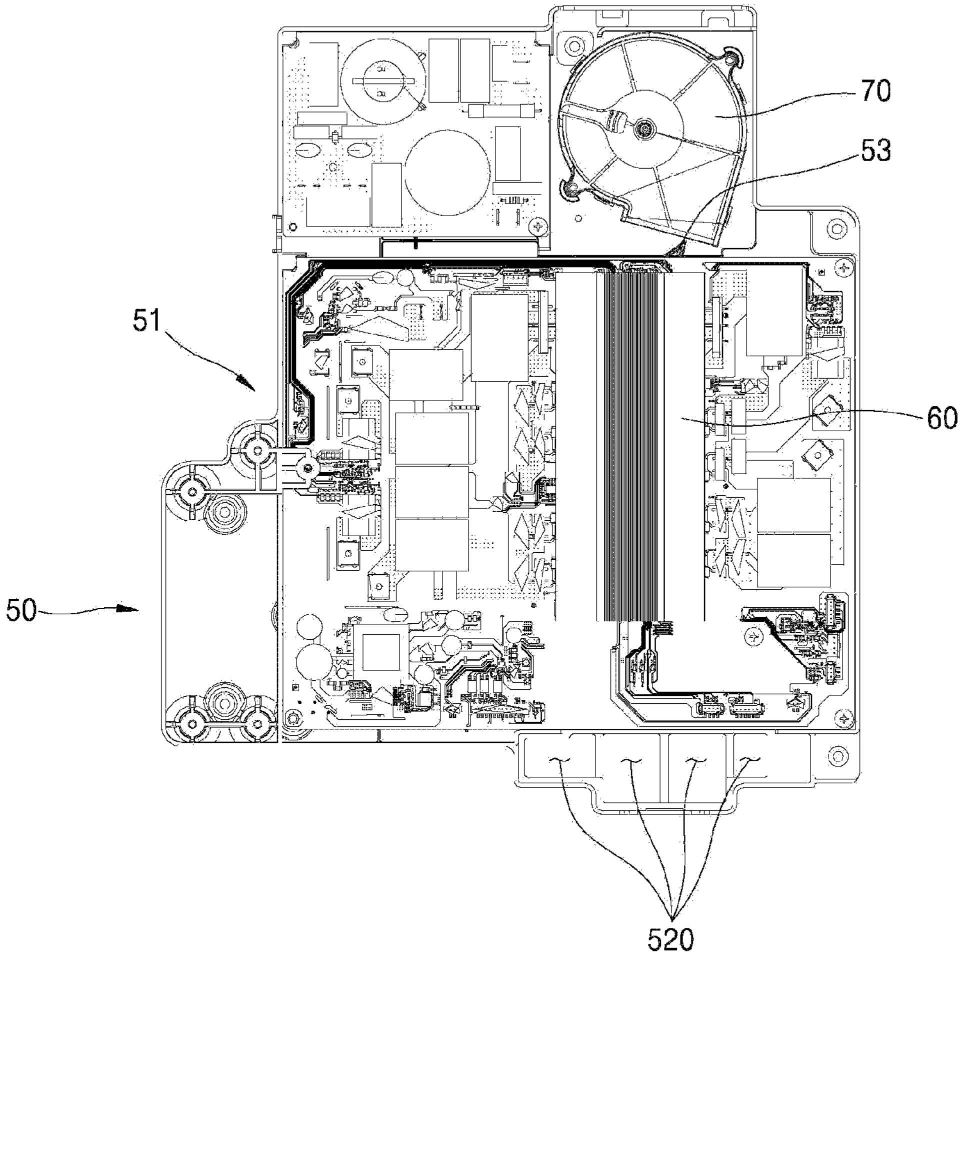
FIG. 11 is a plan view of the printed circuit board mounted on the base bracket of FIG. 10.
Figure 12:
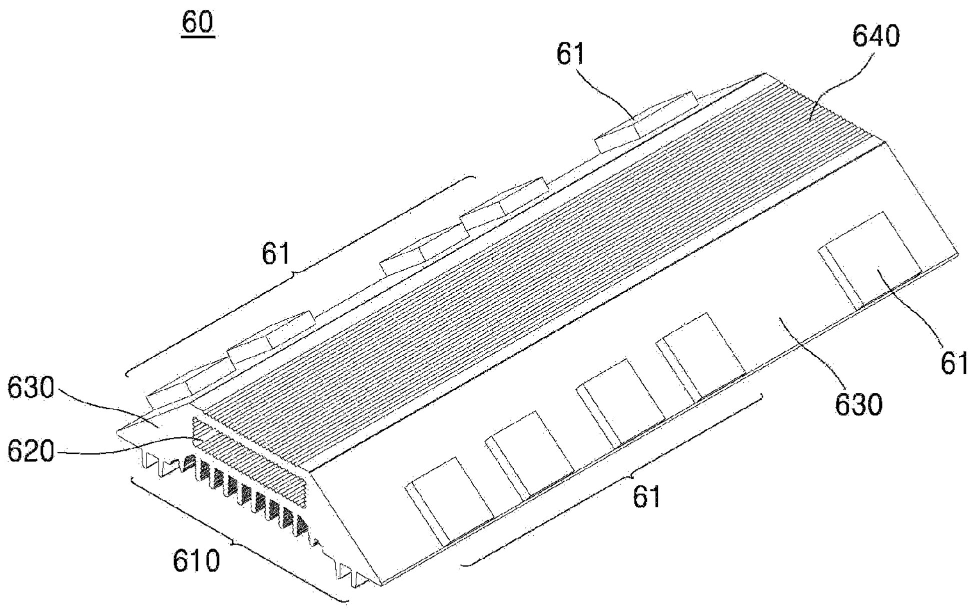
FIG. 12 is a perspective view of a heat sink according to an embodiment.
Figure 13:
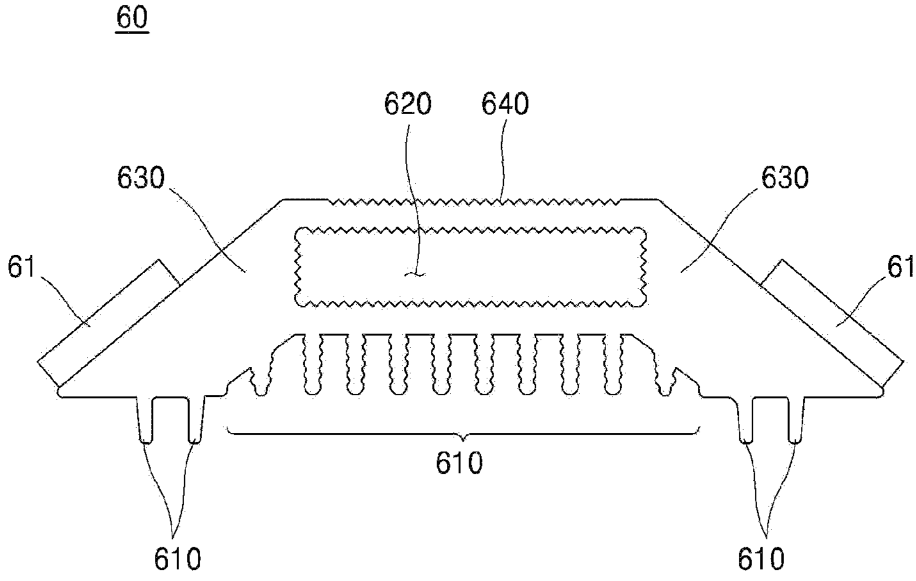
FIG. 13 is a front view of the heat sink according to an embodiment.

FIG. 10 is a perspective view showing a printed circuit board mounted on a base bracket according to an embodiment. FIG. 11 is a plan view of the printed circuit board mounted on the base bracket of FIG. 10. FIG. 12 is a perspective view of a heat sink according to an embodiment. FIG. 13 is a front view of the heat sink according to an embodiment.

A lengthwise direction of heat sink 60 may extend parallel with a direction in which air passing through air guide 80 flows. With this structure, a contact surface and contact time between the heat sink 60 and air flow increases, thereby improving a cooling efficiency of the heat sink 60. To correspond to the above-described disposition structure of the heat sink 60, a lengthwise direction of the air guide 80 may also extend approximately parallel with the direction in which air flows.

As illustrated in FIGS. 12 and 13, the heat sink 60 may include a plurality of cooling fins 610. The plurality of cooling fins 610 may protrude downward from the lower surface of the heat sink 60, and extend in a direction parallel with the lengthwise direction of the heat sink 60. The plurality of cooling fins 610 may help to increase a contact area between the heat sink 60 and air, thereby improving the cooling efficiency of the heat sink 60. Each of the plurality of cooling fins 610 may be spaced on the lower surface of the heat sink 60 in a widthwise direction of the heat sink 60 at predetermined intervals. In this case, the plurality of cooling fins 610 may be respectively formed at slanted part or portion 630 and plane parts or portions 640 of the heat sink 60.

Additionally, the heat sink 60 may include a flow pass 620 that passes through the heat sink 60 in the lengthwise direction and forms a flow path of air. The flow path 620 may extend in the lengthwise direction of the heat sink 60 in such a way that the flow path 620 passes through the plane portion 640 of the heat sink 60.

Like the plurality of cooling fins 610, the flow pass 620 may help to increase a contact area between the heat sink 60 and air, thereby improving the cooling efficiency of the heat sink 60. In this case, the flow pass 620 may have concave and convex portions on an inner surface thereof. The concave and convex portions may help to increase a contact surface between air and the heat sink 60, thereby improving the cooling efficiency of the heat sink 60.

The heat sink 60 may include the slanted portion 630 which is disposed on both sides of the heat sink 60 and the upper surface of which is inclined, and the plane portion 640 which is formed at a center of the heat sink 60 and has the flow pass 620, and the upper surface of which is flat.

The plane portion 640 may have concave and convex portions on the upper surface thereof. The concave and convex portions may help to increase a contact surface between air and the heat sink 60, thereby improving the cooling efficiency of the heat sink 60.

Additionally, some or all of the heat generating elements 61 included in the printed circuit board 51 may be mounted on the upper surface of the slanted portion 630. Accordingly, air blown by the air blowing fan 70 may cool the heat generating elements 61 mounted on the slanted portion 630 of the heat sink 60, and suppress overheating of the printed circuit board 51 effectively.

The slanted portion 630 may have a structure in which a thickness thereof decreases toward its edge. The structure of the slanted portion 630 may help the slanted portion 630 to play a similar role to the cooling fin 610, thereby cooling the heat generating elements 61 mounted on the slanted portion 630 effectively.

Figure 14:
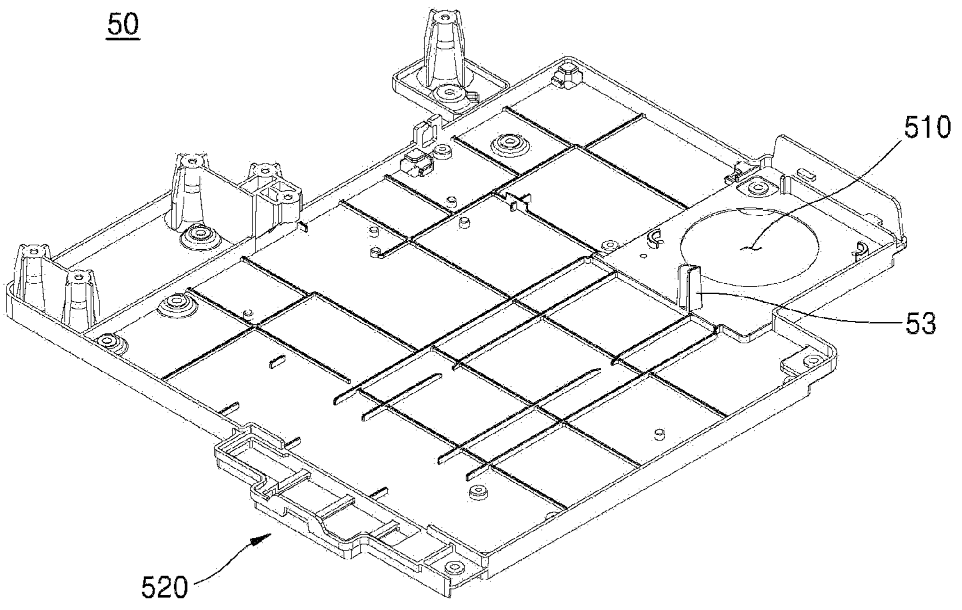
FIG. 14 is a perspective view of the base bracket according to an embodiment.
Figure 15:
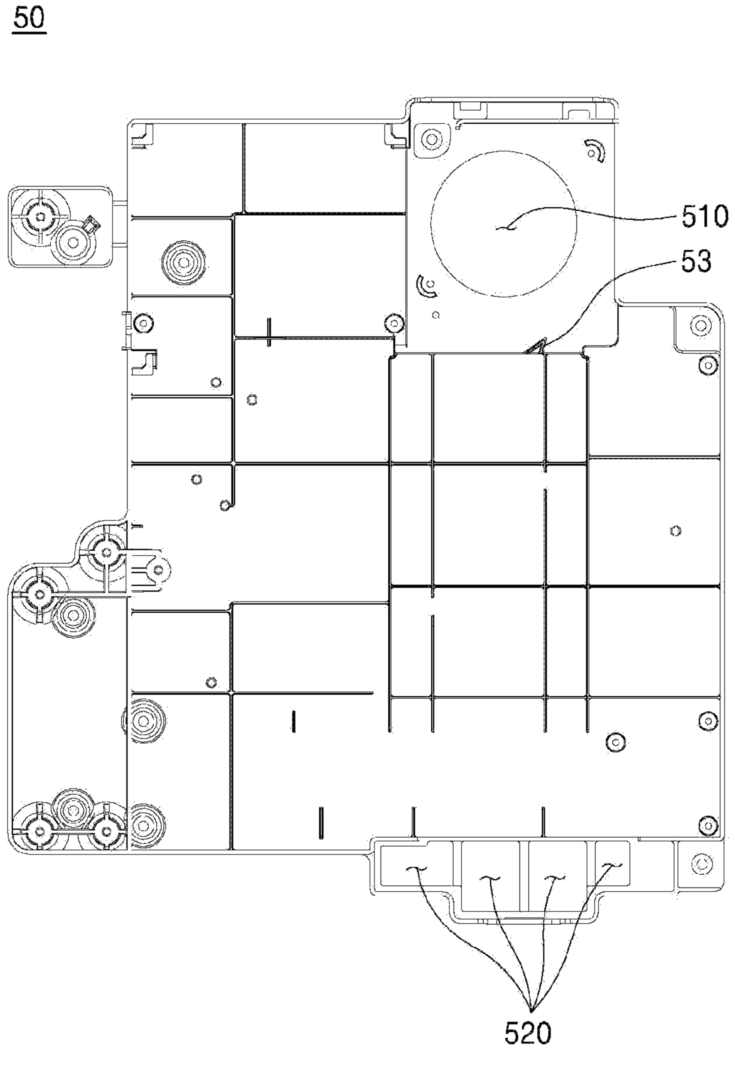
FIG. 15 is a plan view of the base bracket according to an embodiment.

FIG. 14 is a perspective view of the base bracket according to an embodiment. FIG. 15 is a plan view of the base bracket according to an embodiment.

The base bracket 50 may include a first vent part or vent 510 formed in a portion corresponding to the air blowing fan 70, and a second vent part or vent 520 formed in a portion corresponding to the second area 80*b*. In this case, the first vent 510 may have a shape corresponding to a shape of the air blowing fan 70, and the second vent 520 may have a shape corresponding to a shape of the second area 80*b*.

As the air blowing fan 70 operates, air may move upward from the first vent 510 and flow into the air blowing fan 70, and the flow direction of the air may be changed in the air blowing fan 70, flow in the frontward-rearward direction of the electric range, and pass through the air guide 80 and the heat sink 60. The flow direction of the air may change again at the outlet of the air guide 80, flow to the lower side of the electric range, pass through the second vent 520 and then be discharged out of the air guide 80.

A pair of slanted portions 630 may be provided for the heat sink 60, and each of the slanted portions 630 may be disposed in a position at which the pair of slanted portions 630 is symmetrically disposed with respect to a center of the plane portion 640. The heat generating elements 61 required to cool may be disposed on each slanted portion 630.

With this structure, the heat generating elements 61 may be disposed in mutually corresponding positions on both sides of the heat sink 60. To cool the heat generating elements 61 disposed on both sides of the heat sink 60 evenly, the flow direction of air discharged from the outlet of the air blowing fan 70 needs to be guided, and the air needs to flow evenly to both sides of the heat sink 60.

To allow the air to flow evenly to both sides of the heat sink 60, the electric range according to an embodiment may be provided with a vane part or vane 53.

The vane 53 may be disposed in a portion at which the air blowing fan 70 communicates with the air guide 80, and controls the flow direction of air in the air guide 80 to allow the air to flow evenly to both sides of the heat sink 60. For example, the vane 53 may be formed at the base bracket 50. As another example, the vane 53 may be integrated with the air guide 80 at the inlet of the air guide 80. As yet another embodiment, the vane 53 may be integrated with a housing of the air blowing fan 70 at the outlet let of the air blowing fan 70.

Figure 16:
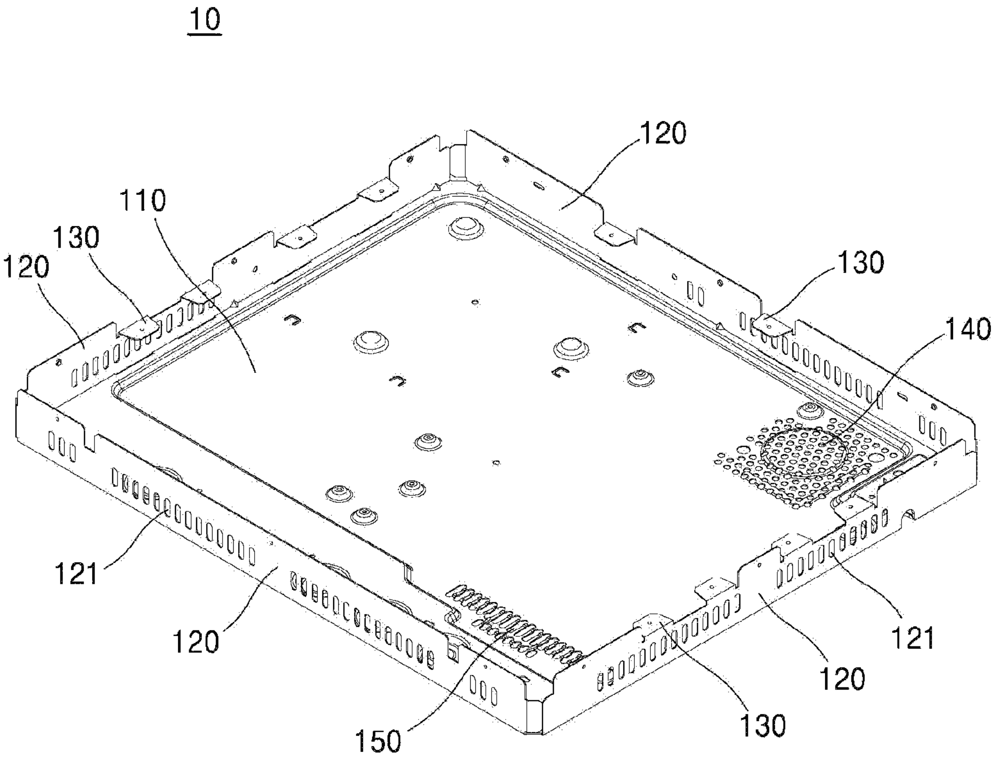
FIG. 16 is a perspective view of a case according to an embodiment.
Figure 17:
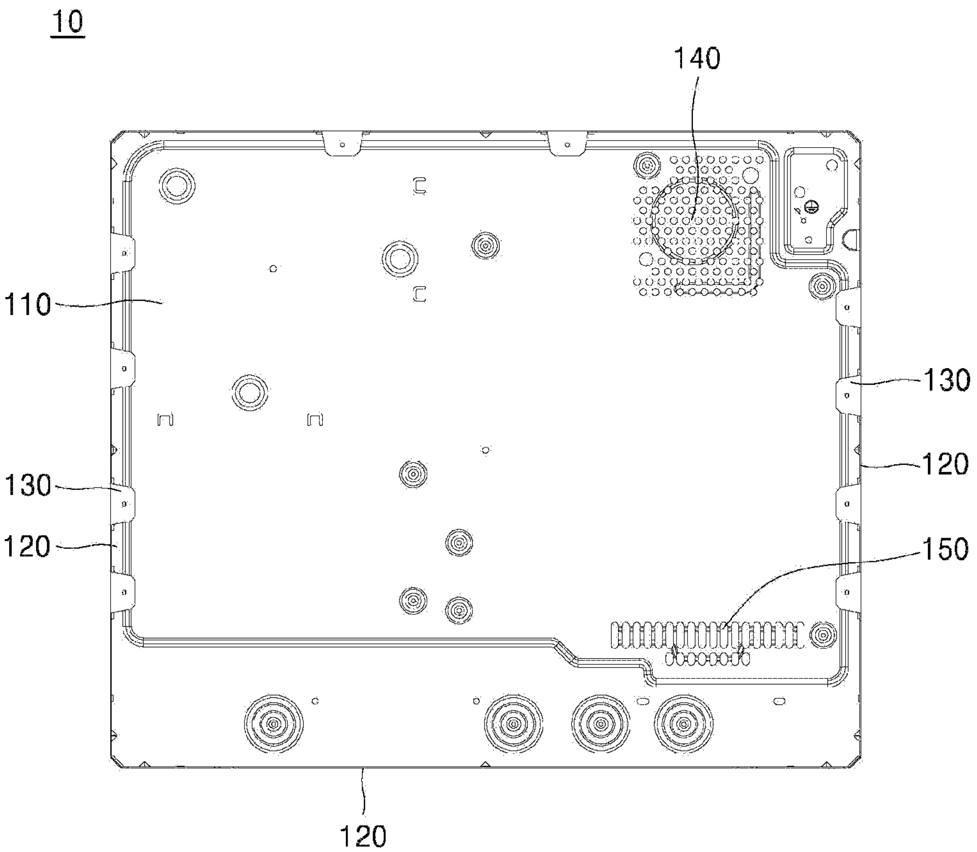
FIG. 17 is a plan view showing the case according to an embodiment.

FIG. 16 is a perspective view of a case according to an embodiment. FIG. 17 is a plan view of the case according to an embodiment.

The case 10 may include a first vent hole 140 and a second vent hole 150, to introduce and discharge air, blown by the air blowing fan 70, effectively.

The first vent hole 140 may be formed in a portion corresponding to the first vent 510, and the second vent hole 150 may be formed in a portion corresponding to the second vent 520. The first vent hole 140 and the second vent hole 150 may be formed in such a way that the first casing 110 forming the bottom surface of the case 10 is penetrated.

A plurality of the first vent hole 140 and a plurality of the second vent hole 150 may be provided. The plurality of first vent holes 140 and the plurality of second vent holes 150 may have a relatively small surface area, to suppress a flow of foreign substances into the electric range through the plurality of first vent holes 140 and the plurality of second vent holes 150 formed at the case 10 which is an outermost wall of the electric range.

Figure 18:
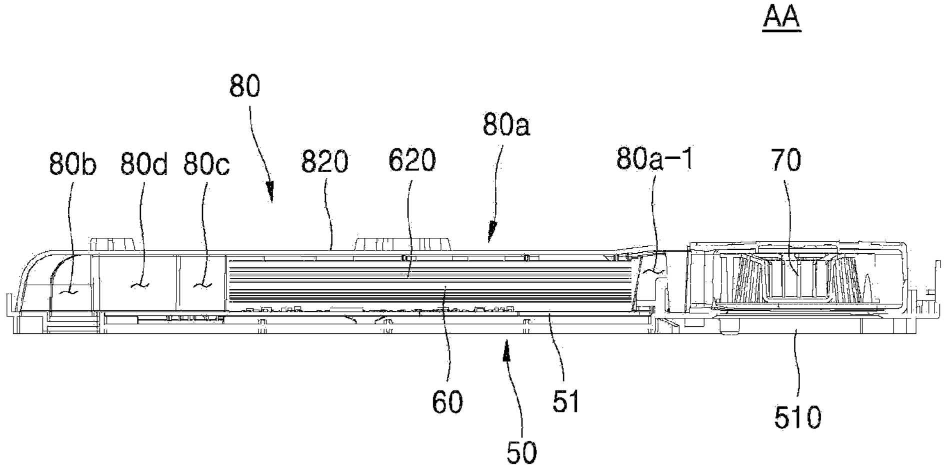
FIG. 18 is a cross-sectional view of the base bracket of FIG. 9, viewed in a direction AA.
Figure 19:
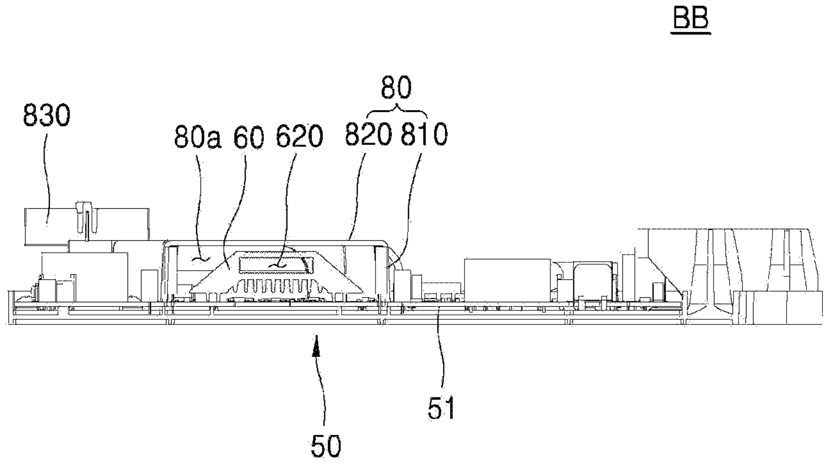
FIG. 19 is a cross-sectional view of the base bracket of FIG. 9, viewed in a direction BB.
Figure 20:
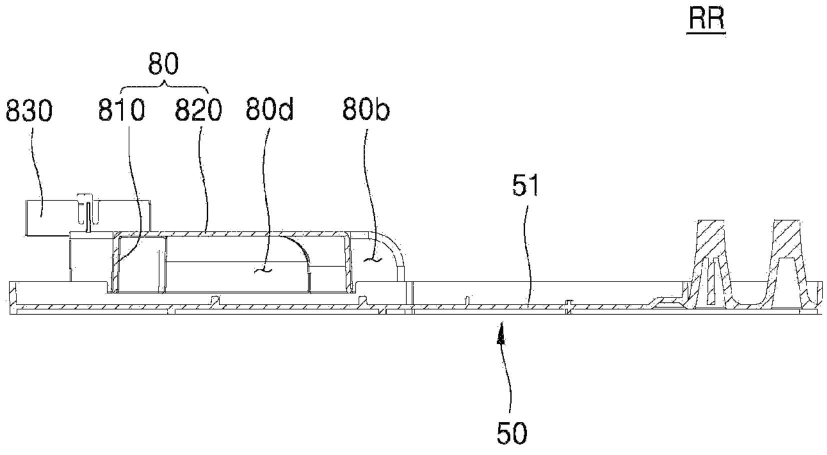
FIG. 20 is a cross-sectional view of the base bracket of FIG. 9, viewed in a direction RR.

FIG. 18 is a cross-sectional view of the base bracket of FIG. 9, viewed in a direction AA. FIG. 19 is a cross-sectional view of the base bracket of FIG. 9, viewed in a direction BB. FIG. 20 is a cross-sectional view of the base bracket of FIG. 9, viewed in a direction RR.

The first area 80*a* of the air guide 80 may communicate with an air discharge portion of the air blowing fan 70, and the heat sink 60 may be disposed in the first area 80*a* of the air guide 80. Accordingly, air discharged from the air blowing fan 70 may cool the heat sink 60 while being guided by the first area 80*a*.

The first area 80*a* of the air guide 80 may include a 1-1 area (80*a*-1) which communicates with the air discharge portion of the air blowing fan 70 and in which the heat sink 60 is not disposed. As the heat sink 60 is not disposed in the 1-1 area (80*a*-1), the 1-1 area (80*a*-1) may have a relatively large space unlike other portions of the first area 80*a*. The first area 80*a* is indicated by hatching lines in FIG. 9.

Air discharged from the air blowing fan 70 may pass through the 1-1 area (80*a*-1), receive heat from the heat sink 60 at an outlet of the 1-1 area (80*a*-1), and be gradually heated while passing through the first area 80*a*. The air, which is heated while passing through the first area 80*a*, may pass through the third area 80*c*, the fourth area 80*d*, and the second area 80*b* consecutively, and then may be discharged out of the air guide 80. In order for the heated air to be smoothly discharged outward, the third area 80*c*, the fourth area 80*d*, and the second area 80*b* may be spaces where the heat sink 60 is not disposed, as illustrated in FIG. 18.

Referring to FIG. 19, the first area 80*a* has a flow space of air with a relatively small surface area as the heat sink 60 is disposed in the first area 80*a*. However, the third area 80*c*, the fourth area 80*d*, and the second area 80*b* significantly expand unlike the first area 80*a* having the flow space of air. Accordingly, the heated air may be smoothly discharged out of the air guide 80 through the third area 80*c*, the fourth area 80*d*, and the second area 80*b*.

Component elements having significant volume or vulnerable to heat may not be disposed in the third area 80*c*, the fourth area 80*d*, and the second area 80*b*. With this structure, the component elements may not interfere with a flow of air, and may be prevented from being heated excessively by heated air.

As described above, the cross-sectional area of the second area 80*b* may be greater than the cross-sectional area of the first area 80*a*, in the air guide 80. Additionally, the cross-sectional area of the fourth area 80*d* may be greater than the cross-sectional area of the first area 80*a*, and the cross-sectional area of the second area 80*b* may be greater than the cross-sectional area of the fourth area 80*d*.

Air may receive heat from the heat sink 60 disposed at the air guide 80, be heated and expand consecutively while flowing from one or a first side of the air guide 80 communicating with the air blowing fan 70 to the other or a second side of the air guide 80 communicating with the third area 80*c*. That is, the pressure of flowing air in a lower stream may be greater than in an upper stream as the pressure of air on the second side may be greater than on the first side in the first area 80*a*. In this case, air may not flow smoothly in the first area 80*a*, and the cooling efficiency of the heat sink 60 may deteriorate.

To reduce the pressure of air on the second side in the first area 80*a*, a cross-sectional area of the first side communicating with the air blowing fan 70 in the first area 80*a* may be less than a cross-sectional area of the second side communicating with the third area 80*c*.

The above-described structure of the first area 80*a*, in which a cross-sectional area increases gradually from the inlet of air toward the outlet of air, may also be applied to the third area 80*c* and the fourth area 80*d*. That is, in each of the first area 80*a*, the third area 80*c*, and the fourth area 80*d*, the cross-sectional areas may increase gradually from the inlet of air toward the outlet of air.

Further, where the cross-sectional area increases in each of the areas, the cross-sectional area of the air guide 80 rapidly increases in portions where the first area 80*a*, the third area 80*c*, and the fourth area 80*d* contact one another, thereby effectively preventing suppression of a smooth flow of air, caused by a scattered flow of air.

Referring to FIG. 17, a total of the cross-sectional areas of the second vent holes 150 formed at the first casing 110 may be the same or greater than the cross-sectional area of the second area 80*b*, considering the cross-sectional area of the second area 80*b*. Thus, air may smoothly flow from the second area 80*b* to the second vent hole 150. Further, where a gap is formed between the outlet of the air guide 80 and the second vent hole 150, a total of the surface areas of the second vent holes 150 may be less than the cross-sectional area of the second area 80*b*.

Embodiments disclosed herein provide an electric range with a structure capable of effectively cooling a printed circuit board and heat generating elements disposed on the printed circuit board. Embodiments disclosed herein further provide an electric range with a structure capable of effectively cooling a heat sink mounted on a printed circuit board. Embodiments disclosed herein furthermore provide an electric range including an air guide with a structure that covers a heat sink and guides air such that the air passes through the heat sink smoothly.

Advantages are not limited to the above advantages, and other advantages that are not mentioned above can be clearly understood from the following description and can be more clearly understood from the embodiments set forth herein. Additionally, the advantages can be realized via means and combinations thereof that are described in the appended claims.

An electric range according to embodiments disclosed herein may include a case, a cover plate coupled to an upper end of the case and allowing an object to be heated to be placed on an upper surface thereof, a heating part or heater disposed under the cover plate and heating an object to be heated, an upper bracket disposed under the heating part and supporting the heating part, a base bracket disposed under the upper bracket and allowing a printed circuit board to be mounted thereon, a heat sink mounted on the printed circuit board, an air blowing fan mounted on the base bracket and discharging air toward the heat sink, and an air guide that communicates with the air blowing fan, surrounds the heat sink, and forms a flow path of air that cools the heat sink. The air guide may include a first lateral wall and a second lateral wall, and a flow space in which air flows may be formed by the first lateral wall and the second lateral wall.

A pair of first lateral walls may be respectively disposed on both sides of the heat sink. An upper wall may be coupled to an upper end of the pair of first lateral walls and cover the heat sink.

The air guide may include a first area, a second area, a third area, and a fourth area. The first to fourth areas may be areas into which the flow space of air, formed by the air guide, is divided.

The first area may communicate with the air blowing fan, and guide air such that the air flows in a lateral direction of the base bracket. The heat sink may be disposed in the first area. Air having flown to the air guide from the air blowing fan may flow in the heat sink and cool the heat sink while passing through the first area of the air guide.

The second area may bend in the upward-downward direction of the base bracket, and guide air such that the air is discharged outward. The second area may be formed to face a lower side of the electric range such that a flow direction of the air having flown to the air guide changes. That is, the upper wall may bend downward in the second area of the air guide, and guide air discharged from the second area such that the air flows to the lower portion of the case. Air discharged from the air blowing fan may flow into the air guide in the frontward-rearward direction of the electric range, and escape from the air guide in the downward direction of the electric range.

The third area may extend from the first area, and change the flow direction of air having passed through the first area. For the air guide, the first lateral wall may bend to have a slant in the end portion of the first area, to form the third area. That is, the first lateral wall may be formed to have a slant with respect to the frontward-rearward direction of the air guide in the third area of the air guide. Air may flow at a slant with respect to the frontward-rearward direction of the air guide in the third area.

The fourth area may extend from the third area, communicate with the second area, and change the flow direction of air having passed through the third area. The first lateral wall may bend to have a slant in the end portion of the third area, to form the fourth area. That is, the first lateral wall may be formed to have a slant with respect to the first lateral wall of the third area at the outlet of the third area of the air guide. Air flowing in the air guide may flow in the frontward-rearward direction of the air guide again in the fourth area.

A lengthwise direction of the heat sink may be parallel with the flow direction of air passing through the air guide. A contact surface and contact time between the heat sink and air flow may increase, thereby improving a cooling efficiency of the heat sink.

The heat sink may include a plurality of cooling fins. The plurality of cooling fins may protrude downward from a lower surface of the heat sink, and be formed in a direction parallel with the lengthwise direction of the heat sink.

The heat sink may be provided with a flow pass that passes through the heat sink in a lengthwise direction and forms a flow path of air. The flow pass may be formed in the lengthwise direction of the heat sink, and pass through a plane part or portion of the heat sink.

The heat sink may include a slanted part or portion which is disposed on both sides of the heat sink and an upper surface of which is inclined, and a plane part or portion which is formed at a center of the heat sink and has the flow pass, and an upper surface of which is flat.

Additionally, some or all of the heat generating elements included in the printed circuit board may be mounted on the upper surface of the slanted portion. Accordingly, air blown by the air blowing fan to flow may cool the heat generating elements mounted on the slanted portion of the heat sink, and suppress the overheating of the printed circuit board effectively.

The base bracket may include a first vent part or vent formed in a portion corresponding to the portion of the air blowing fan, and a second vent part or vent formed in a portion corresponding to the fourth area. The first vent may have a shape corresponding to a shape of the air blowing fan, and the second vent may have a shape corresponding to a shape of the fourth area.

The case may include a first vent hole and a second vent hole, to introduce and discharge air, blown by the air blowing fan, effectively. The first vent hole may be formed in a portion corresponding to the portion of the first vent, and the second vent hole may be formed in a portion corresponding to the portion of the second vent. The first vent hole and the second vent hole may be formed in such a way that the first casing forming the bottom surface of the case is penetrated.

In the air guide, a cross-sectional area of the flow path of air in a portion in which air is discharged outward may be greater than in a portion in which the air guide and the air blowing fan communicate. That is, the cross-sectional area at the outlet of the air guide may be greater than at the inlet of the air guide.

In the air guide, a cross-sectional area of a portion where air flows into the heat sink may be greater than a cross-sectional area of a portion where air escapes from the heat sink. As the heat sink is disposed in the first area of the air guide, the portion corresponding to the portion where air flows into the heat sink may be the first area of the air guide. Additionally, the portion corresponding to the portion where air escapes from the heat sink may be the second area of the air guide. Accordingly, a cross-sectional area of the second area may be greater than a cross-sectional area of the first area.

The cross-sectional area of the second area may be 1.2 times greater than the cross-sectional area of the first area. More specifically, the cross-sectional area of the second area may be 1.5 to 3 times greater than the cross-sectional area of the first area.

An electric range according to embodiments disclosed herein may include a case, a heating part or heater disposed in the case and heating an object to be heated, a base bracket disposed under the heater and allowing a printed circuit board to be mounted thereon, a heat sink mounted on the printed circuit board, an air blowing fan mounted on the base bracket and discharging air toward the heat sink, and an air guide that communicates with the air blowing fan, surrounds the heat sink and forms a flow path of air that cools the heat sink. The air guide may have a structure in which a cross-sectional area of a flow space of air expands gradually from an inlet of the air guide toward an outlet of the air guide. Accordingly, even if air is heated and expanded, the pressure of the air may decrease from the inlet of the air guide further toward the outlet of the air guide.

Air having flown into the air guide may smoothly flow from the inlet of the air guide to the outlet of the air guide, and a cooling efficiency of the heat sink disposed in the air guide may improve. Additionally, the cross-sectional area of the air guide through which air flows may increase gradually from the inlet toward the outlet, thereby preventing suppression of a smooth flow of air, which is caused when air flows in a scattered manner due to a rapid increase in the cross-sectional area of any certain portion.

In the present invention, an electric range may include a case, a cover plate coupled to an upper end of the case, wherein an object to be heated is placed on an upper surface thereof, an air blowing fan configured to discharge air, and an air guide that communicates with the air blowing fan, wherein a cross-sectional area of the flow path of air in a portion of the air guide at which air is discharged outward is greater than a cross-sectional area of the flow path of air at a portion of the air guide at which the air guide and the air blowing fan communicate.

The air guide may include a first area, a second area. The second area may guide air such that the air is discharged outward. The second area may face a lower side of the electric range, and change a flow direction of the air having flow into the air guide.

Embodiments are described above with reference to a number of illustrative embodiments thereof. However, embodiments are not limited to the embodiments and drawings set forth herein, and numerous other modifications and embodiments can be devised by one skilled in the art within the technical scope. Further, the effects and predictable effects based on the configurations are to be included within the range though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric range, comprising:
- a case;
- a cover plate coupled to an upper end of the case, wherein an object to be heated is placed on an upper surface thereof;
- an air blowing fan configured to discharge air; and
- an air guide that communicates with the air blowing fan, wherein a cross-sectional area of the flow path of air in a portion of the air guide at which air is discharged outward is greater than a cross-sectional area of the flow path of air at a portion of the air guide at which the air guide and the air blowing fan communicate, wherein the air guide comprises:
  - a first area that communicates with the air blowing fan and guides air to flow;
  - a second area that guides the air to be discharged outward; and
  - a changing area that connects the first area and the second area and changes a flow direction of air having passed through the first area to the second area, and wherein the cross-sectional area of the air guide increases gradually from the first area to the changing area, and the second area.

2. The electric range of claim 1, further comprises a heat sink mounted on a printed circuit board, wherein the air guide surrounds the heat sink, and forms a flow path of air that cools the heat sink, and wherein a cross-sectional area of a portion of the air guide in which air flows to the heat sink is greater than in a portion of the air guide in which air flows from the heat sink.

3. The electric range of claim 2,
- wherein a cross-sectional area of the second area is greater than a cross-sectional area of the first area.

4. The electric range of claim 3, wherein the cross-sectional area of the second area is 1.5 to 3 times greater than the cross-sectional area of the first area.

5. The electric range of claim 2, wherein the air guide changing area comprises:
- a third area that extends from the first area and changes a flow direction of air having passed through the first area; and
- a fourth area that extends from the third area, communicates with the second area, and changes a flow direction of air having passed through the third area.

6. The electric range of claim 5, wherein the air guide comprises:
- a pair of first lateral walls disposed respectively on both sides of the heat sink; and
- an upper wall that is coupled to an upper end of the pair of first lateral walls and covers the heat sink.

7. The electric range of claim 6, wherein the first lateral wall of the air guide is bent to have a slant at an end portion of the first area, to form the third area, and the first lateral wall of the air guide is bent to have a slant at an end portion of the third area, to form the fourth area.

8. The electric range of claim 6, wherein the upper wall of the air guide is bent downward in the second area and guides air discharged from the second area to flow to a lower portion of the case.

9. The electric range of claim 5, further comprises a base bracket on which the printed circuit board is mounted, wherein the base bracket comprises:
- a first vent formed in a portion corresponding to the air blowing fan; and a second vent formed in a portion corresponding to the second area.

10. The electric range of claim 9, wherein the case comprises:

a plurality of first vent holes formed in a portion corresponding to the first vent; and a plurality of second vent holes formed in a portion corresponding to the second vent.

11. The electric range of claim 5, wherein a cross-sectional area of the fourth area is greater than a cross-sectional area of the first area, and a cross-sectional area of the second area is greater than the cross-sectional area of the fourth area.

12. The electric range of claim 5, wherein a cross-sectional area at a boundary between the first area and the third area is smaller than a cross-sectional area at a boundary between the third area and the fourth area.

13. The electric range of claim 1, wherein a lengthwise direction of the heat sink extends parallel with a flow direction of air passing through the air guide.

14. The electric range of claim 13, wherein the heat sink comprises a plurality of cooling fins that protrudes downward from a lower surface of the heat sink and extends in a direction parallel with the lengthwise direction of the heat sink.

15. The electric range of claim 14, wherein the heat sink includes a flow pass that passes through the heat sink in the lengthwise direction and forms a flow path of air.

16. The electric range of claim 15, wherein the heat sink comprises:

a slanted portion disposed on both sides of the heat sink, an upper surface of which is inclined; and a plane portion which is formed at a center of the heat sink, having the flow path therein, and an upper surface of which is flat.

17. An electric range, comprising:

a case;

at least one heater disposed in the case and configured to heat an object to be heated;

a base bracket disposed under the at least one heater and on which a printed circuit board is mounted;

a heat sink mounted on the printed circuit board;

an air blowing fan mounted on the base bracket and configured to discharge air toward the heat sink; and an air guide that communicates with the air blowing fan, surrounds the heat sink, and forms a flow path of air that cools the heat sink, wherein the air guide comprises:

a first area that communicates with the air blowing fan and guides air to allow the air to flow in a lateral direction of the base bracket;

a second area that is bent in an upward-downward direction of the base bracket and guides air to allow the air to be discharged outward; and a changing area that connects the first area and the second area and changes a flow direction of air having passed through the first area to the second area, and wherein the cross-sectional area of the air guide increases gradually from the first area to the changing area, and the second area.

18. The electric range of claim 17, wherein a cross-sectional area of the second area is 1.5 to 3 times greater than a cross-sectional area of the first area.

19. The electric range of claim 18, wherein the changing area comprises:

a third area that extends from the first area and changes a flow direction of air having passed through the first area; and a fourth area that extends from the third area, communicates with the second area, and changes a flow direction of air having passed through the third area, wherein a cross-sectional area of the fourth area is greater than the cross-sectional area of the first area, and wherein the cross-sectional area of the second area is greater than the cross-sectional area of the fourth area.

20. An electric range, comprising:

a case;

a cover plate coupled to an upper end of the case, wherein an object to be heated is placed on an upper surface thereof;

at least one heater including a working coil disposed under the cover plate and configured to heat the object to be heated;

an upper bracket disposed under the at least one heater and configured to support the at least one heater;

a base bracket disposed under the upper bracket and on which a printed circuit board is mounted;

a heat sink mounted on the printed circuit board;

an air blowing fan mounted on the base bracket and configured to discharge air toward the heat sink; and an air guide that communicates with the air blowing fan, surrounds the heat sink, and forms a flow path of air that cools the heat sink, wherein comprises:

a first area that communicates with the air blowing fan and guides air to allow the air to flow in a lateral direction of the base bracket;

a second area that is bent in an upward-downward direction of the base bracket and guides air to allow the air to be discharged outward;

a third area that extends from the first area and changes a flow direction of air having passed through the first area; and a fourth area that extends from the third area, communicates with the second area, and changes a flow direction of air having passed through the third area, and wherein the cross-sectional area of the air guide increases gradually from the first area to the third area, the fourth area, and the second area.

* * * * *